July 1, 1958 K. R. McCLURE 2,840,939
SELF-LOCKING TAG
Filed July 28, 1955

INVENTOR.
Kenneth R. McClure
BY W. Bartlett Jones,
Attorney

United States Patent Office 2,840,939
Patented July 1, 1958

2,840,939

SELF-LOCKING TAG

Kenneth R. McClure, St. Charles Township, Kane County, Ill., assignor to Wallace J. Dickey, St. Charles Township, Kane County, Ill.

Application July 28, 1955, Serial No. 525,020

3 Claims. (Cl. 40—21)

The present invention relates to self-locking seals or tags, and, in particular, to a tag which may be used for application to food products, such as meat, to certify the same.

Meat is sold by two general types of packers—one being the so-called U. S. Government inspected plants and the other being the so-called non-inspected plants. The United States Department of Agriculture has official grades of meat in the order of best quality for retail sale, as follows: prime, choice, good, commercial, and utility. It is a practice of the inspected houses to place a Government certification or inspection stamp on the meat and to label the quality at the time of inspection. Such pieces have been heretofore delivered to butchers who cut them into smaller pieces for retail sale and consumption. Such resulting pieces, except for a few instances, are without any indication of quality or of Government inspection.

The recent trend in merchandising meat is to wrap the retail cuts in cellophane paper. The most advanced practice in this field is for the packer to cut the pieces into the consumer sizes and to wrap the same in cellophane. When this practice is adopted in Government inspected plants, it is possible for each package to bear certification of Government inspection and identification of quality. The present invention provides an identification tag which may be secured by the packer or inspector to such a package or to a cut or other contents of the package.

It is the general object of the invention to provide a low cost identification tag which may be easily applied, and, when applied, is tamper-resistant and yet easy and safe for removal by the ultimate consumer.

It is a particular object of the invention to provide such a tag in the form of a self-locking seal.

It is a further object of the invention to provide a tag which is permanent in character, not subject to staining or deterioration in contact with the meat, and one which does not in any way impair or contaminate the meat itself.

Various other and ancillary objects and advantages of the invention will become apparent from the folowing description and explanation of the invention as shown in the accompanying drawings in which.

Figure 1:
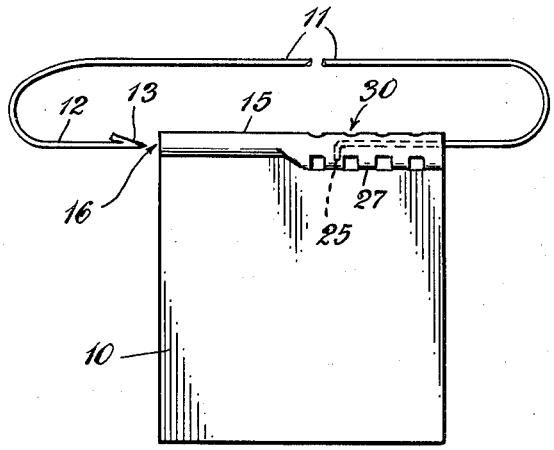
Fig. 1 is a face view of the tag ready for use.

In general, the invention provides a tag of sheet material which may be plastic, metal or specially treated fiber providing an area for indicia such as is required for meat products as indicated above. The tag has secured to it a tie member which preferably is a metal wire for strength, for greater permanence and for greater tamper-proof qualities. Adjacent the free end of the tie member is a barb of suitable size and structure to cooperate with a walled opening connected to or formed from the sheet material and provided on the interior with detent means for the barb.

Although the foregoing objectives and general characteristics of structure may be effected in numerous ways, the structure illustrated in the drawing is the presently preferred form of the invention. Although the following description and explanation are directed to the preferred form, it is to be understood that the invention is not limited to or by the structure and the details thereof, other modifications and changes being contemplated as falling within the scope of the appended claims.

The preferred form is provided by a piece of metal 10, preferably aluminum foil or sheet. A thickness of 0.006 inch is suitable. Such metal is preferred because of its ready workability permitting an edge thereof to be rolled or crimped in a suitable fashion to secure to the tag one end of a tie wire 11. Likewise, such metal is preferred because the same or another edge may be deformed, as by rolling to provide a walled opening or socket for receiving the barbed end while readily permitting the provision of detent means within the walled opening. For convenience and simplicity, it is preferred that a single edge be deformed to anchor the tie wire at one end of said edge and to provide the walled opening at the other end of said edge.

In the drawing, the tie wire 11 is a thin piece of wire such as aluminum, or steel for strength, a diameter of 0.020 to 0.030 inch being suitable. For protecting a steel wire and also the meat through which it may pass, the steel wire is preferably tin coated. In the vicinity of the free end 12 of the wire 11, there is formed a barb, as by bending the end reversely as shown at 13, and, in so doing, forming a sharp point at the bend for easily penetrating the meat.

Figure 2:
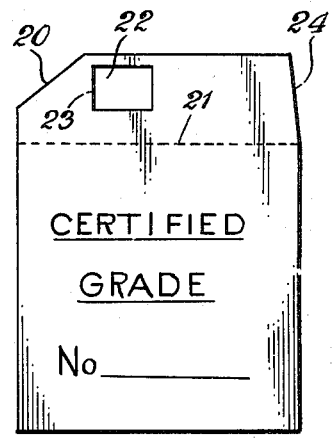
Fig. 2 is a face view of the blank from which the tag is made.

The preferred finished structure is shown in Fig. 1 in which the one edge 15 of the sheet 10 is a rolled-over edge so formed as to provide a walled opening for the barb to enter at the point indicated by the numeral 16, and providing anchorage at the other end for the wire 11. In making such structure, a flat blank of metal as shown in Fig. 2 has a corner clipped off as indicated by the numeral 20 so that on rolling the clipped edge inwardly to the dotted line 21 the opening 16 for the barb is a funnel-like opening because of the clipped corner 20. Just inwardly of the clipped corner, a hole 22 is punched in the blank which hole becomes so housed within the rolled edge that it forms a niche in the wall of the tubular opening with its edge 23 acting as a detent for the barb 13. The edge opposite the line 20 is slightly clipped as at 24 so that on rolling the end of the roll is smooth.

To anchor the tie to the tag, the anchored end is bent to form a very short leg 25 of a right-angle bend. This bent end of the wire tie is housed within the rolled edge 15 when the rolling is effected. The roll is not made tight but rather loose in order to provide a sufficiently large opening for entry of the barbed end 12, and also to provide looseness in the roll for a clamping and crimping operation for the wire 11.

Figure 3:
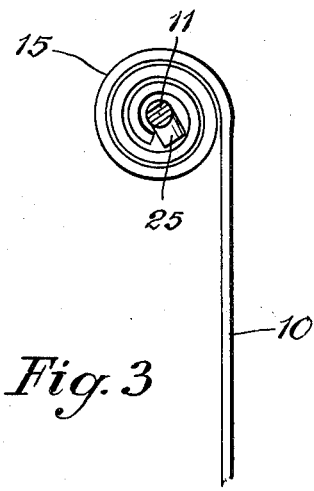
Fig. 3 is an enlarged end view of the blank of Fig. 1 after the initial rolling, showing the tie included within the roll.

Fig. 3 is an enlarged end view of the rolled sheet 10 showing the wire 11 in cross-section before the final crimping and clamping operation is performed.

Figure 4:
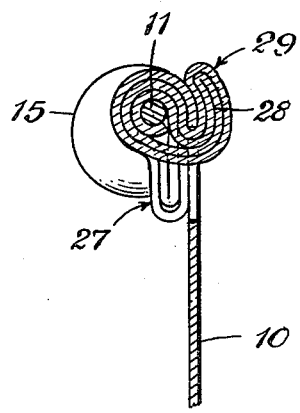
Fig. 4 is a cross-sectional view taken on the line 4—4 of Fig. 1 showing the final structure resulting from operation on structure shown in Fig. 3.

Fig. 4 shows the structure of Fig. 3 after the loosely rolled portion has been flattened by suitable means below the location of the wire 11 to tighten the grip of the coiled layers on it and to provide a flat area designated 27 in Fig. 1 and Fig. 4.

In order further to grip the wire 11 in its clamped position within the rolled edge, the flattened area 27 is punched to form a series of three-sided ears 28 involving the metal of the roll at the flat area 27 and also the metal of the sheet behind the roll as shown in Fig. 4. The fourth side of the ears is connected at a level just below the anchored wire. The ears are then moved through the punched holes in the metal 10 and rolled around toward the top of the rolled edge as shown at 29. At the same time, the top of the edge 15 is crimped as shown at 30.

The structure as described is tamper-proof, in the sense that tampering leaves evidence of the tampering. The tag must be of structure to permit easy removal, because it is to be received untampered by the ultimate consumer, who should not be presented with a problem for its removal. A normally strong pull will part the connections to permit removal. Attempts to unroll the barb-receiving end to release the barb will result in breaking or ripping of the metal, because of the short radius of roll and the crimped and pressed relationship at the opposite edge.

The tag area of the sheet 10 may be variously provided with indicia. The preferred method is to mechanically impress the indicia in the thin metal.

It is to be understood that the invention may be embodied in items of small or large size, and for uses other than with meats, and various changes in structure are contemplated, all without departure from the invention as expressed in the appended claims.

I claim:

1. A tag comprising a piece of sheet metal and a flexible tie member of wire, the tie member being barbed at a free end and at its other end being carried by the sheet metal piece, the carried end having retaining means projecting from the cross-section of the wire, the sheet metal piece in blank form having hole therethrough close to and inwardly from one edge, said edge being rolled inwardly of the sheet in a manner to provide a walled opening through the roll and including the carried end of the tie in the walled opening, the said hole being located to form a niche in the walled opening, said rolled end over the tie being crimped over said retaining means to lock the tie therein, and the barbed end being constructed for insertion in the walled opening to be engaged in said niche against withdrawal.

2. The tag of claim 1 in which the roll inwardly from the location of the carried tie is flattened against the unrolled portion of the sheet metal.

3. The tag of claim 2 in which at least one ear formed in the flattened roll and in the adjacent sheet metal extending in the direction away from the roll overlies the exterior of said rolled portion of the sheet.

References Cited in the file of this patent

UNITED STATES PATENTS

| | | |
|---|---|---|
| 235,668 | Brooks | Dec. 21, 1880 |
| 464,174 | Foote | Dec. 1, 1891 |
| 683,245 | Brown | Sept. 24, 1901 |
| 1,032,414 | Martineau | July 16, 1912 |
| 1,871,064 | Kipper et al. | Aug. 9, 1932 |
| 2,189,026 | Dietze | Feb. 6, 1940 |